US012422192B2

(12) United States Patent
Isono et al.

(10) Patent No.: US 12,422,192 B2
(45) Date of Patent: Sep. 23, 2025

(54) HEAT TREATMENT FURNACE

(71) Applicants: NGK INSULATORS, LTD., Nagoya (JP); NGK KILNTECH, CORPORATION, Nagoya (JP)

(72) Inventors: Takanori Isono, Inazawa (JP); Taiki Kinnan, Nagoya (JP); Michihiro Ito, Nagoya (JP)

(73) Assignees: NGK INSULATORS, LTD., Nagoya (JP); NGK Kilntech, Corporation, Nagoya (JP)

( * ) Notice: Subject to any disclaimer, the term of this patent is extended or adjusted under 35 U.S.C. 154(b) by 429 days.

(21) Appl. No.: 18/049,386

(22) Filed: Oct. 25, 2022

(65) Prior Publication Data

US 2023/0168036 A1 Jun. 1, 2023

(30) Foreign Application Priority Data

Nov. 30, 2021 (JP) ................................. 2021-193988

(51) Int. Cl.
*F27D 9/00* (2006.01)
*F27B 9/12* (2006.01)
(Continued)

(52) U.S. Cl.
CPC .............. *F27B 9/2407* (2013.01); *F27B 9/12* (2013.01); *F27D 1/12* (2013.01); *F27D 9/00* (2013.01);
(Continued)

(58) Field of Classification Search
CPC .... F27B 9/2407; F27B 9/12; F27B 2009/124; F27D 9/00; F27D 1/12; F27D 2009/004;
(Continued)

(56) References Cited

U.S. PATENT DOCUMENTS 6,693,949 B1 2/2004 Schubert et al.

FOREIGN PATENT DOCUMENTS

JP S6036874 Y2 * 11/1985
JP 3053262 A 10/1998
(Continued)

OTHER PUBLICATIONS

JP S6036874 Y2 translation (Year: 1985).*
(Continued)

*Primary Examiner* — Steven S Anderson, II
*Assistant Examiner* — Kurt J Wolford
(74) *Attorney, Agent, or Firm* — BURR PATENT LAW, PLLC

(57) ABSTRACT

A heat treatment furnace disclosed herein may include: a heat treatment unit configured to heat-treat an object; a cooling unit configured to cool the object heat-treated by the heat treatment unit; and a conveyor configured to convey the object in the heat treatment unit and the cooling unit. The cooling unit may include a housing, wherein the housing is disposed below a conveyance path on which the object is conveyed by the conveyor and configured to cool the object being conveyed by the conveyor by liquid flowing inside the housing. The housing may include an upper plate facing the object being conveyed by the conveyor. The upper plate may be tilted so that gas stays at a predetermined portion of the housing while the liquid is flowing in the housing.

8 Claims, 5 Drawing Sheets

(51) Int. Cl.
*F27B 9/24* (2006.01)
*F27D 1/12* (2006.01)

(52) U.S. Cl.
CPC .. *F27B 2009/124* (2013.01); *F27D 2009/004* (2013.01); *F27D 2009/0043* (2013.01); *F27D 2009/0067* (2013.01); *F27D 2009/0083* (2013.01)

(58) Field of Classification Search
CPC ..... F27D 2009/0043; F27D 2009/0067; F27D 2009/0083
See application file for complete search history.

(56) References Cited

FOREIGN PATENT DOCUMENTS

| | | | |
|---|---|---|---|
| JP | 2003-501612 | A | 1/2003 |
| JP | 2006-343018 | A | 12/2006 |
| JP | 2007-017100 | A | 1/2007 |
| JP | 2011-075184 | A | 4/2011 |

OTHER PUBLICATIONS

Mini_Mover_incline_decline_conveyor_units.pdf (Year: 2021).*
Japanese Office Action (Application No. 2021-193988) dated Jun. 18, 2024 (with English translation) (6 pages).

* cited by examiner

HEAT TREATMENT FURNACE

CROSS-REFERENCE TO RELATED APPLICATION

The present application claims priority to Japanese Patent Application No. 2021-193988, filed on Nov. 30, 2021, the entire contents of which are incorporated herein by reference.

TECHNICAL FIELD

The technology disclosed herein relates to a heat treatment furnace configured to heat treat objects, more specifically to a technology for cooling heat-treated objects in a heat treatment furnace.

BACKGROUND ART

A heat treatment furnace (e.g., a roller hearth kiln) may be used to heat-treat objects. The heat treatment furnace generally includes a cooling unit configured to cool objects that were heat treated by a heat treatment unit. In the cooling unit, the heat-treated objects may be cooled by a housing (typically, a water-cooling jacket) that is installed in the furnace and configured to cool the heat-treated objects by liquid (e.g., water) flowing in the housing. For example, Japanese Patent Application Publication No. 2011-75184 describes an example of a water jacket. In the cooling unit of the heat treatment furnace, the cooling housings are disposed above and below a conveyance path of the heat-treated objects and along a conveying direction. Thus, the cooling housing generally has a cuboid shape disposed along the conveying direction.

SUMMARY

Regarding cuboid-shaped housings for cooling, such as the one described in Japanese Patent Application Publication No. 2011-75184, it is difficult to make all the surfaces of a cuboid-shaped housing perfectly flat due to deformations from manufacturing errors, etc. If a deformation to an upper surface of the housing results in a hollow bulge on the upper surface of the housing, gas may be trapped in the bulge (i.e., a part of space within the housing that corresponds to the hollow of the bulge). When such a cooling housing is disposed below heat-treated objects, the upper surface of the housing is heated to a high temperature due to heat radiation from the heat-treated objects conveyed from the heat treatment unit. In this instance, the bulge is not sufficiently cooled by liquid flowing in the housing since the gas is trapped in this space of the housing. As a result, the portion of the housing (i.e., the portion of the housing where the gas is trapped) may be locally heated to a temperature above a tolerable temperature of the housing, leading to early deterioration of the housing.

The disclosure herein provides a technology for suppressing early deterioration of a cooling housing installed in a cooling unit.

A heat treatment furnace disclosed herein may comprise: a heat treatment unit configured to heat-treat an object; a cooling unit configured to cool the object that was heat treated by the heat treatment unit; and a conveyor configured to convey the object in the heat treatment unit and the cooling unit. The cooling unit may comprise a housing, wherein the housing is disposed below a conveyance path on which the object is conveyed by the conveyor and configured to cool the object being conveyed by the conveyor by liquid flowing inside the housing. The housing may comprise an upper plate facing the object being conveyed by the conveyor. The upper plate may be tilted so that gas stays at a predetermined portion of the housing while the liquid is flowing in the housing.

DETAILED DESCRIPTION

Figure 1:
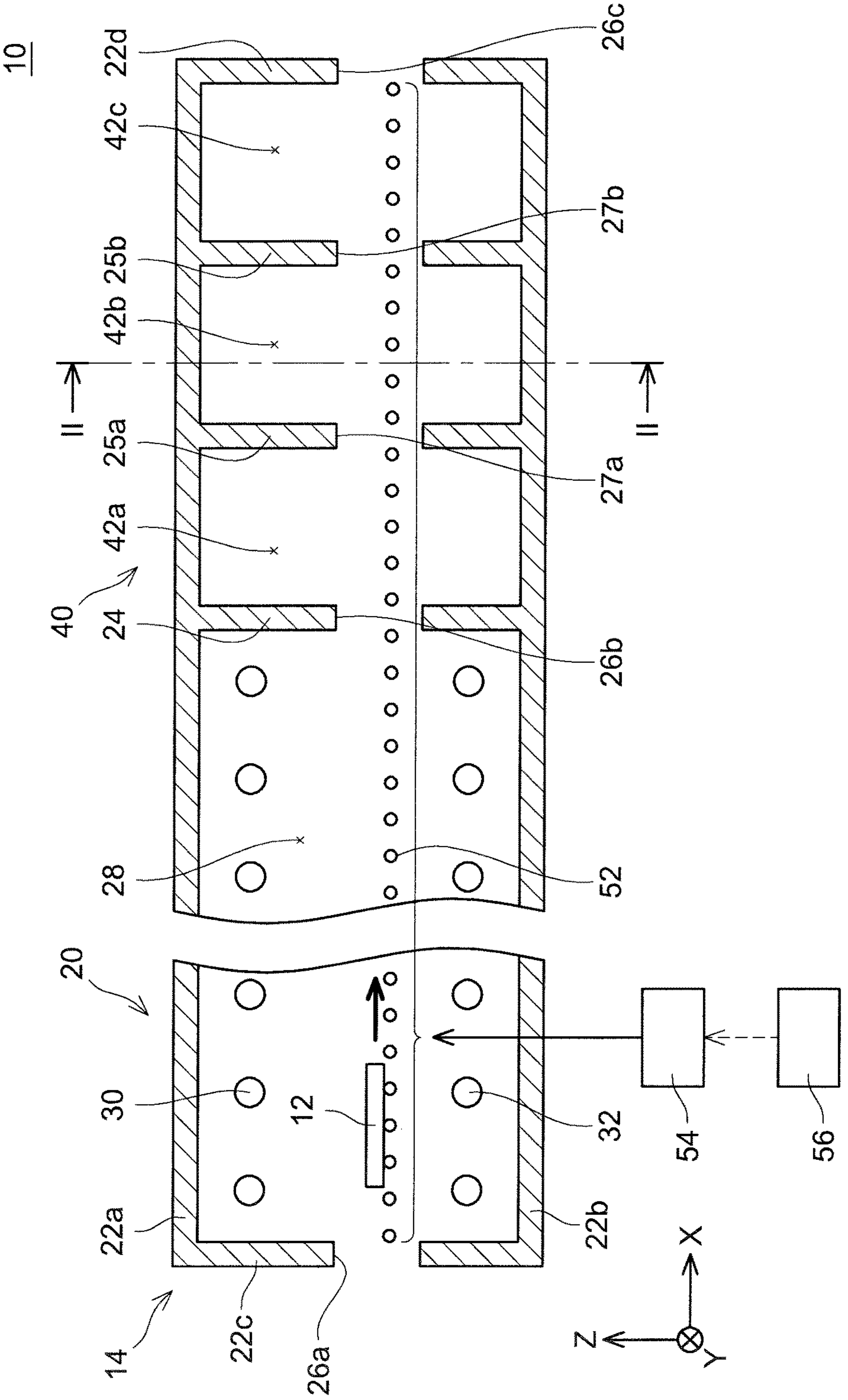
FIG. 1 is a diagram illustrating a schematic configuration of a heat treatment furnace according to first and second embodiments, and a longitudinal cross-sectional view of the heat treatment furnace taken along a plane parallel to a conveying direction of objects to be treated.

Representative, non-limiting examples of the present disclosure will now be described in further detail with reference to the attached drawings. This detailed description is merely intended to teach a person of skill in the art further details for practicing preferred aspects of the present teachings and is not intended to limit the scope of the present disclosure. Furthermore, each of the additional features and teachings disclosed below may be utilized separately or in conjunction with other features and teachings to provide improved heat treatment furnaces. as well as methods for using and manufacturing the same.

Moreover, combinations of features and steps disclosed in the following detailed description may not be necessary to practice the present disclosure in the broadest sense, and are instead taught merely to particularly describe representative examples of the present disclosure. Furthermore, various features of the above-described and below-described representative examples, as well as the various independent and dependent claims. may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Some of the features characteristic to below-described embodiments will herein be listed. It should be noted that the respective technical elements are independent of one another, and are useful solely or in combinations. The combinations thereof are not limited to those described in the claims as originally filed.

A heat treatment furnace disclosed herein may comprise: a heat treatment unit configured to heat treat an object; a cooling unit configured to cool the object that was heat treated by the heat treatment unit; and a conveyor configured to convey the object in the heat treatment unit and the cooling unit. The cooling unit may comprise a housing, wherein the housing is disposed below a conveyance path on which the object is conveyed by the conveyor and configured to cool the object being conveyed by the conveyor by liquid flowing inside the housing. The housing may comprise an upper plate facing the object being conveyed by the conveyor. The upper plate may be tilted so that gas stays at a predetermined portion of the housing while the liquid is flowing in the housing.

In the heat treatment furnace described above, the upper plate is tilted so that the gas stays at the predetermined portion of the housing while the liquid is flowing in the housing. Since a site where the gas will stay is predictable, the gas can be avoided from being trapped at an unintentional site, and measures can be taken to prevent a local high temperature at the site where the gas stays (i.e., the predetermined portion of the housing). This facilitates avoiding early deterioration of the housing due to the housing being locally heated to a temperature above its tolerable temperature.

In the heat treatment furnace disclosed herein, the upper plate may be tilted in a conveying direction of the object and is tilted in a width direction as viewed in the conveying direction. According to this configuration, the upper plate is tilted in two directions, namely the conveying direction and a direction perpendicular to the conveying direction, thereby limiting the highest region of the housing. This facilitates measures to prevent the local high temperature at the site where the gas stays (which may be termed "gas site" hereinafter).

In the heat treatment furnace disclosed herein, the upper plate may be tilted by 2 degrees or more. According to this configuration, the gas site can be positioned not at a central portion of the housing but at an end portion thereof since the upper plate is tilted by 2 degrees or more.

In the heat treatment furnace disclosed herein, the upper plate may be tilted by 2 degrees or more in the conveying direction.

In the heat treatment furnace disclosed herein, the upper plate may be tilted by 2 degrees or more in the width direction.

In the heat treatment furnace disclosed herein, as the housing is viewed in the conveying direction, an upper surface of an upper end portion of the upper plate may be covered with a heat insulating material. According to this configuration, the upper surface of the upper end portion, that is. the upper surface of the gas site is covered with the heat insulating material. Thus, the local high temperature at the gas site can be suppressed.

In the heat treatment furnace disclosed herein, the housing may further comprise a liquid supply port defined in a portion of the housing where a height level of the upper plate is lowest, and a liquid discharge port defined in a portion of the housing where the height level of the upper plate is highest. This configuration helps to flow the liquid from the liquid supply port of the housing (i.e., the portion of the housing where the height level of the upper plate is the lowest) toward the liquid discharge port thereof (i.e., the portion of the housing where the height level of the upper plate is the highest). Further, since the liquid flows from the lower side to the higher side, gas is less likely to stay at sites other than the highest site.

In the heat treatment furnace disclosed herein, the housing may further comprise a fin provided on an upper surface of the upper plate and exposed to an internal space of the cooling unit. This configuration can improve the cooling capacity of the cooling unit by the housing since the housing comprises the fin.

EMBODIMENTS

First Embodiment

Referring to the drawings, a heat treatment furnace 10 according to an embodiment will be described. As illustrated in FIG. 1, the heat treatment furnace 10 comprises a heat treatment unit 20, a cooling unit 40, and a conveyor (52, 54). The heat treatment furnace 10 heat-treats objects 12 while the objects 12 are conveyed through the heat treatment unit 20 by the conveyor and also cools the objects 12 that were heat treated in the heat treatment unit 20 while the heat-treated objects 12 are conveyed through the cooling unit 40 by the conveyor. For clarity of the drawing, FIG. 1 omits the depiction of housings 44, 60 (which will be described later) disposed in the cooling unit 40.

Examples of the objects 12 to be heat treated include, for example, stacks of a ceramic dielectric body (substrate) and electrode(s), positive-electrode materials for lithium-ion batteries, negative-electrode materials for lithium-ion batteries, etc. When the heat treatment furnace 10 is used to heat treat the ceramic stacks, the ceramic stacks may be placed on plate-shaped setters for conveyance in the furnace. When the heat treatment furnace 10 is used to heat-treat the positive-electrode materials or the negative-electrode materials for lithium-ion batteries, the materials may be placed in box-shaped saggars for conveyance in the furnace. In the heat treatment furnace 10 according to the present embodiment, a plurality of setters or saggars is placed on conveyor rollers 52 (which will be described later) along a conveying direction (along X-direction) and/or along a direction perpendicular to the conveying direction (along Y-direction) for conveyance. Hereinafter, as used in the present embodiment, the whole combination of an object to be heat treated and a setter or a saggar on/in which the object is placed will be termed "object 12".

Figure 2:
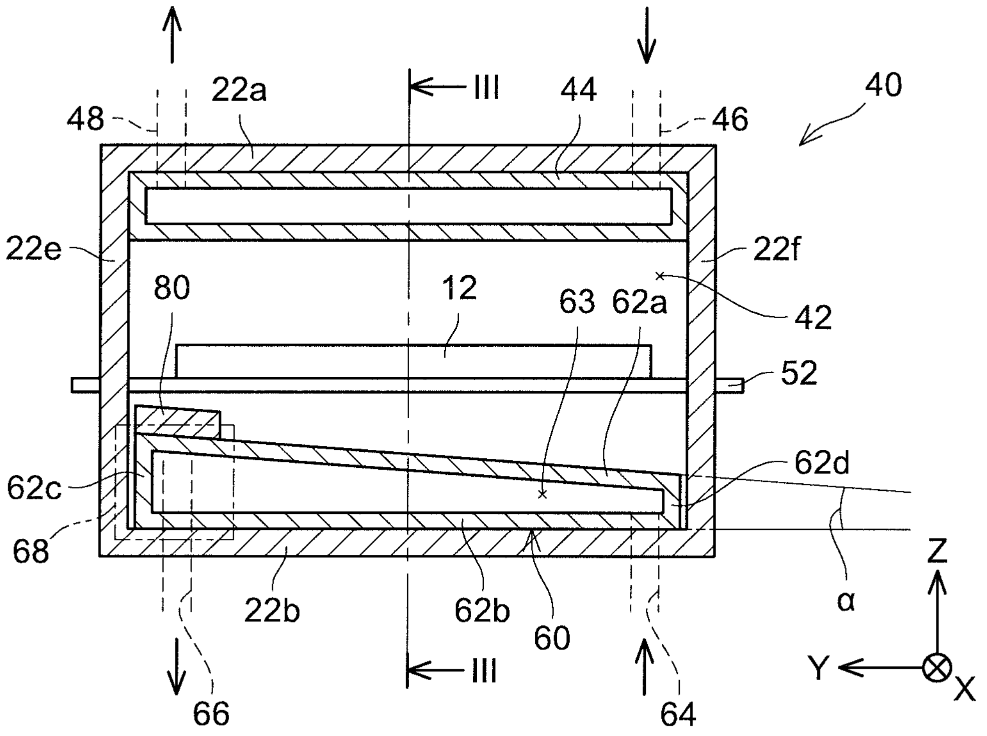
FIG. 2 is a cross-sectional view taken along a line II-II in FIG. 1.

As illustrated in FIGS. 1 and 2, the heat treatment furnace 10 is configured of a furnace body 14 having an approximately cuboid shape, and the heat treatment unit 20 and the cooling unit 40 are disposed in the furnace body 14. The furnace body 14 comprises a ceiling wall 22*a*, a bottom wall 22*b*, and side walls 22*c* to 22*f*. The ceiling wall 22*a* is parallel to the bottom wall 22*b* (i.e., parallel to XY plane). As illustrated in FIG. 1, the side wall 22*c* is positioned at an inlet end of a conveyance path and perpendicular to the conveying direction (i.e., parallel to YZ plane). The side wall 22*d* is positioned at an outlet end of the conveyance path and parallel to the side wall 22*c* (i.e., parallel to YZ plane). As illustrated in FIG. 2, the side walls 22*e*, 22*f* are parallel to the conveying direction and perpendicular to the ceiling wall 22*a* and the bottom wall 22*b* (i.e., parallel to XZ plane). A partition wall 24 is disposed in the furnace body 14. In the furnace body 14, the heat treatment unit 20 is positioned upstream of the partition wall 24 and the cooling unit 40 is positioned downstream of the partition wall 24.

The heat treatment unit 20 is defined by the ceiling wall 22*a*, the bottom wall 22*b*, the side walls 22*c*, 22*e*. 22*f*. and the partition wall 24. A plurality of heaters 30, 32 and a plurality of conveyor rollers 52 are disposed in the heat treatment unit 20. The heaters 30 are arranged above the conveyor rollers 52 at predetermined intervals in the conveying direction, and the heaters 32 are arranged below the conveyor rollers 52 at predetermined intervals in the conveying direction. An internal space 28 of the heat treatment unit 20 is heated by the heaters 30, 32 generating heat, so that the object 12 is heated. The heat treatment unit 20 may be partitioned into a plurality of spaces by additional partition wall(s) therein, although this is not illustrated. In this instance. the plurality of spaces may be adjusted to have varying atmosphere temperatures.

The cooling unit 40 is positioned downstream of the heat treatment unit 20. The cooling unit 40 is defined by the ceiling wall 22*a*, the bottom wall 22*b*, the partition wall 24, and the side walls 22*d*, 22*e*, 22*f*. Partition walls 25*a*, 25*b* are disposed in the cooling unit 40. The cooling unit 40 is partitioned into a plurality of spaces 42 (three spaces 42*a*, 42*b*, 42*c* in the present embodiment) by the partition walls 25*a*, 25*b*. Housings 44, 60 for cooling are disposed in each of the spaces 42*a*, 42*b*, 42*c*. The housings 44, 60 will be described later in detail.

As illustrated in FIG. 1, an opening 26*a* is defined in the side wall 22*c*, and an opening 26*c* is defined in the side wall 22*d*. Further, an opening 26*b* is defined in the partition wall 24, and an opening 27*a* and an opening 27*b* are defined in the partition wall 25*a* and the partition wall 25*b*, respectively. The object 12 is conveyed into the heat treatment furnace 10 through the opening 26*a* by the conveyor, conveyed through the heat treatment unit 20, and is then conveyed into the cooling unit 40 through the opening 26*b*. Then, the object 12 is conveyed through the spaces 42*a*, 42*b*, 42*c* of the cooling unit 40 through the openings 27*a*, 27*b* by the conveyor, and is then conveyed out from the heat treatment furnace 10 through the opening 26*c*.

The conveyor (52, 54) comprises the plurality of conveyor rollers 52 and a drive unit 54. The conveyor rollers 52 convey the object 12. The conveyor (52, 54) conveys the object 12 into the heat treatment unit 20 through the opening 26*a* and conveys the object 12 in the heat treatment unit 20 and the cooling unit 40. The conveyor (52, 54) then conveys the object 12 out from the cooling unit 40 through the opening 26*c*.

The conveyor rollers 52 are cylindrical and their axes extend in a direction perpendicular to the conveying direction (i.e., in Y-direction). The conveyor rollers 52 all have the same diameter and are arranged at regular intervals in the conveying direction. The conveyor rollers 52 are supported such that they are rotatable about their axes, and rotate by transmission of drive power of the drive unit 54 thereto.

The drive unit 54 is a drive unit configured to drive the conveyor rollers 52 (e.g., a motor). The drive unit 54 is connected to the conveyor rollers 52 via a power transmission mechanism. The conveyor rollers 52 rotate when the drive power of the drive unit 54 is transmitted to the conveyor rollers 52 via the power transmission mechanism. For the power transmission mechanism, a known mechanism can be used, for example, a mechanism including a sprocket and a chain can be used. The drive unit 54 drives the respective conveyor rollers 52 such that the conveyor rollers 52 rotate at approximately the same speed. The drive unit 54 is controlled by a controller 56.

Figure 3:
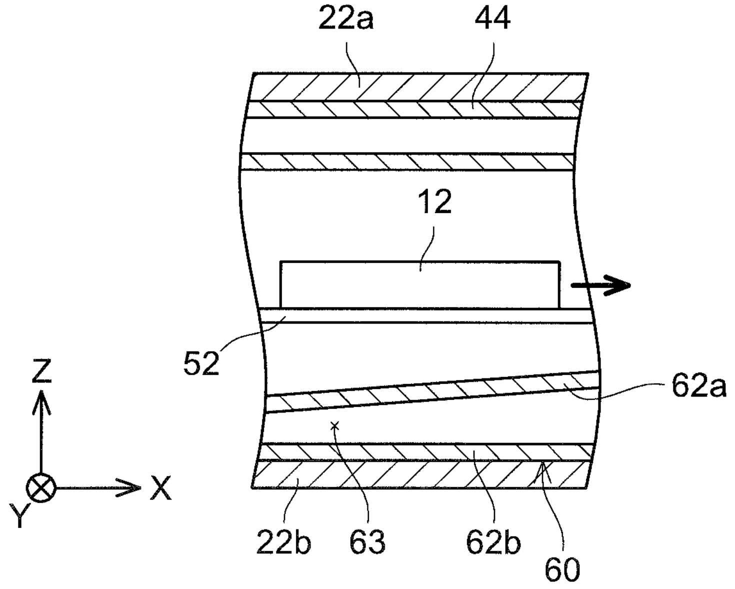
FIG. 3 is a cross-sectional view taken along a line III-III in FIG. 2.

Next, the housings 44, 60 disposed in the cooling unit 40 will be described. As illustrated in FIGS. 2 and 3, the housings 44, 60 are disposed in the cooling unit 40. The housings 44 are disposed above the conveyor rollers 52. The housings 44 each have a cuboid shape, and in the present embodiment, are constituted of stainless steel. The housings 44 are configured to allow liquid (which is water in the present embodiment) to flow therein. The housings 44 are positioned in upper portions of the spaces 42 of the cooling unit 40, and lower surfaces of the housings 44 are exposed to the spaces 42. Each housing 44 comprises a supply port 46 for water supply from the outside and a discharge port 48 for water discharge to the outside. Water supplied from the supply ports 46 flows through the housings 44 and is then discharged from the discharge ports 48. By water flowing in the housings 44, the housings 44 cool the spaces 42 via their lower surfaces.

The housings 60 are disposed below the conveyor rollers 52. The housings 60 each have a cuboid shape, and in the present embodiment, are constituted of stainless steel. The housings 60 are configured to allow liquid to flow therein, and in the present embodiment, water flows in the housings 60. However, liquid to be flowed in the housings 60 is not limited to water. The housings 60 are positioned in lower portions of the spaces 42 of the cooling unit 40, and upper surfaces of the housings 60 are exposed to the spaces 42. Each housing 60 comprises a supply port 64 for water supply from the outside and a discharge port 66 for water discharge to the outside. Water supplied from the supply ports 64 flows through the housings 60 and is then discharged from the discharge ports 66. By water flowing in the housings 60. the housings 60 cool the spaces 42 via their upper surfaces.

Figure 4:
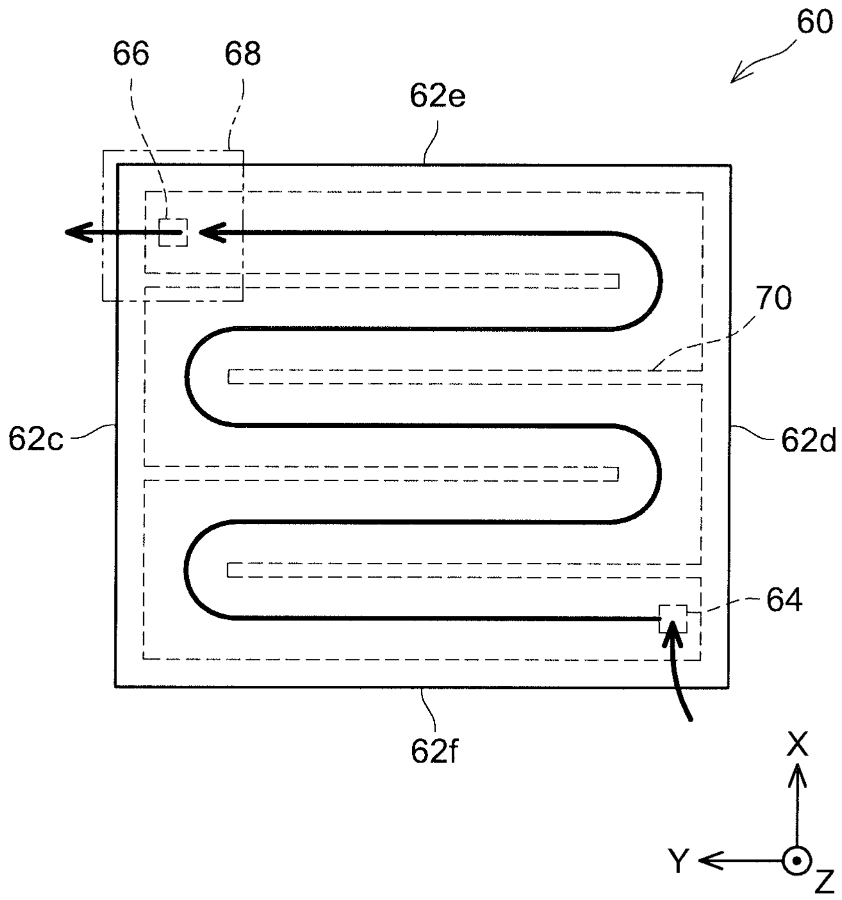
FIG. 4 is a top view of a housing disposed below conveyor rollers.

As illustrated in FIGS. 2 to 4, each housing 60 comprises an upper plate 62*a*. a lower plate 62*b*, and side plates 62*c*, 62*d*, 62*e*, 62*f*. The upper plate 62*a*, the lower plate 62*b*, and the side plates 62*c*, 62*d*, 62*e*, 62*f* have a flat-plate shape, and a space 63 surrounded by the upper plate 62*a*, the lower plate 62*b*, and the side plates 62*c*, 62*d*, 62*e*, 62*f* is defined within the housing 60. Partition walls 70 are disposed in the space 63. The partition walls 70 will be described later in detail. The upper plate 62*a* faces the object 12. The upper plate 62*a* is tilted with respect to a horizontal direction (e.g . . . with respect to an upper surface of the bottom wall 22*b*). As illustrated in FIG. 2, as viewed in the conveying direction of the object 12 (in X-direction in FIG. 2) (i.e., in a cross section taken along YZ plane), the upper plate 62*a* is tilted such that one end surface thereof (in FIG. 2, +Y-direction end surface) is positioned higher than another end surface thereof (in FIG. 2, −Y-direction end surface). Since the upper plate 62*a* has a flat-plate shape in the present embodiment, the upper plate 62*a* being tilted means that an upper surface of the upper plate 62*a* (a surface thereof exposed to the space 42) and a lower surface of the upper plate 62*a* (a surface thereof exposed to the inside of the housing 60) are also tilted. Since the upper plate 62*a* is tilted, gas within the housing 60 flows toward the one end surface (the +Y-direction end surface) which is positioned higher than the other end surface (the −Y-direction end surface). That is, gas is less likely to stay near the other end surface (the −Y-direction end surface) and in a portion between the one end surface and the other end surface.

It is difficult to make the upper plate 62*a* perfectly flat due to deformations from manufacturing errors, etc. If the upper plate 62*a* has a dent, gas may be trapped in the dent. The upper plate 62*a* being tilted helps the gas within the housing 60 to flow toward the one end surface without being trapped in the dent, etc. resulted from deformations. Thus, a site where the gas stays can be limited to an intended site and the gas can be avoided from being trapped at an unintended site.

Further, as illustrated in FIG. 3, the upper plate 62*a* is further tilted along the conveying direction of the object 12 (in FIG. 3, along +X-direction) (i.e., in a cross section taken along XZ plane) such that one end surface thereof (in FIG. 3, +X-direction end surface (downstream end surface)) is positioned higher than another end surface thereof (in FIG. 3. −X-direction end surface (upstream end surface)). That is, in the top view of the upper plate 62*a*, a corner portion of the upper plate 62*a* in +X-direction plus +Y-direction is positioned at the highest height level and a corner portion of the upper plate 62*a* in −X-direction plus −Y-direction is positioned at the lowest height level (see FIG. 4). Tilting the upper plate 62*a* such that one corner thereof is positioned at the highest height level helps limiting a region where gas stays (a region 68 in FIG. 4) to a specific region.

A tilt angle α (see FIG. 2) of the upper plate 62*a* can be 2 degrees or more and 45 degrees or less with respect to the horizontal direction. The tilt angle of 2 degrees or more suppresses the gas from staying in portions other than the highest region 68 and helps to flow the gas to the region 68 more efficiently. Further, the tilt angle of 45 degrees or less suppresses the lowest portion from being too apart from the object 12 and thus suppresses decrease in the cooling capacity for the object 12. The tilt angle of 45 degrees or less further suppresses an extreme increase in the size of the heat treatment furnace in an up-down direction.

As illustrated in FIG. 2, a heat insulating material 80 is disposed on a portion of the upper surface of the upper plate 62*a* that corresponds to the highest region 68. Since the region 68 is positioned at the highest height level, a distance between the region 68 and the object 12 can be small. The object 12 has a high temperature since it has been conveyed through the heat treatment unit 20 before conveyed into the cooling unit 40. Thus, the portion of the upper plate 62*a* corresponding to the region 68 may be heated to a temperature beyond the tolerable temperature of the housing 60 by heat radiation from the high-temperature object 12. Covering the region 68 with the heat insulating material 80 suppresses the region 68 of the upper plate 62*a* from being heated to a high temperature by the heat radiation from the object 12. In the present embodiment, gas is less likely to stay in portions other than the region 68 since the upper plate 62*a* is tilted. Thus, covering only the region 68 with the heat insulating material 80 can avoid the entire upper plate 62*a* being heated to a temperature beyond the tolerable temperature.

Next, how water flows within the housing 60 will be described. As illustrated in FIG. 4, the supply port 64 is positioned near the corner portion in −X-direction plus −Y-direction, and the discharge port 66 is positioned near the corner portion in +X-direction plus +Y-direction. That is, the supply port 64 is positioned near the lowest portion of the upper plate 62*a*, and the discharge port 66 is positioned near the highest portion (the region 68) of the upper plate 62*a*. Water is supplied into the housing 60 through the lowest portion of the upper plate 62*a* and discharged from the housing 60 through the highest portion of the upper plate 62*a*. Thus, even when bubbles are generated in the water flowing in the housing 60, the bubbles flow toward the region 68 along with the water and are less likely to be trapped in portions other than the region 68. Further, as illustrated in FIG. 2, an upper end of the discharge port 66 is positioned near the upper plate 62*a* in the space 63 and thus the discharge port 66 discharges the water from near the upper plate 62*a*. That is, the water in the housing 60 is discharged from near the upper plate 62*a* in the region 68. Thus, the water in the housing 60 is discharged from the highest portion of the space 63.

A flow path along which water flows is defined within the housing 60. That is, a plurality of partition walls 70 is disposed within the housing 60. The partition walls 70 have a plate shape and extend in Y-direction. The dimension of the partition walls 70 in Y-direction is smaller than the dimension of the housing 60 in Y-direction. Each partition wall 70 has its one end connected to a side wall of the housing 60 and has its other end spaced from another side wall of the housing 60. The partition walls 70 are spaced from each other in X-direction. The partition walls 70 are arranged such that their +Y-direction ends and −Y-direction ends are alternately connected to side walls of the housing 60. That is, a partition wall 70 has its +Y-direction end connected to a side wall of the housing 60, and another partition wall 70 adjacent to that partition wall 70 in X-direction has its −Y-direction end connected to another side wall of the housing 60. This arrangement of the partition walls 70 allows water supplied into the housing 60 to flow tortuously in the housing 60. Since the water can flow all over within the housing 60, the cooling capacity of the housing 60 can be improved. Further, the partition walls 70 are spot-welded to the upper plate 62*a*. That is, the partition walls 70 are partially welded to the upper plate 62*a*, and at positions where the partition walls 70 are not welded to the upper plate 62*a*, water and gas can flow through between the partition walls 70 and the upper plate 62*a*. This makes it less likely for the gas to stay between the partition walls 70 and the upper plate 62*a* and helps the water and the gas flow to the discharge port 66 (i.e., the region 68) without being trapped in the middle of the flow path.

In the present embodiment, tilting the upper plate 62*a* of the housing 60 facilitates gas to flow to a predetermined portion (the highest portion) of the housing 60. Thus, the gas is avoided from being trapped in unintended portions. If gas is trapped in the housing 60, sites where the gas is trapped are hard to be cooled by water. Therefore, the sites are locally heated to a high temperature by the heat radiation from the object 12 and thus may come to have a temperature beyond the tolerable temperature of the housing. Covering portions that would be heated to a high temperature with a heat insulating material can avoid these portions having a temperature beyond the tolerable temperature, however, it is desirable to cover only a portion where gas stays with a heat insulating material because the cooling capacity of the housing 60 is decreased when the surface of the housing 60 is covered with the heat insulating material over a wide range. Thus, when the gas is trapped in unintended portions, this makes it hard to take measures (e.g., covering by a heat insulating material, etc.) to avoid these portions from having a high temperature. According to the present embodiment, the gas is likely to stay in the intended region by the upper plate 62*a* being tilted. Thus, the portion where the gas stays can be identified in advance and measures to avoid a high temperature, such as covering by the heat insulating material 80, can be taken easily. Further, it is possible to make the gas stay in a portion that has less influence on the function of the cooling unit 40 (e.g., end portion).

Upper and lower plates of the housing 44 described above (i.e., the housing 44 disposed in an upper portion of the cooling unit 40) need not be tilted. Among portions of the housing 44, the lower plate is located close to the object 12. Thus, the upper plate of the housing 44 is less likely to have a high temperature, and even when the upper plate of the housing 44 has a dent due to deformations from manufacturing errors, etc., the dent is less likely to have a high temperature due to the gas being trapped therein. Further, even when the lower plate of the housing 44 has a dent due to deformations from manufacturing errors, etc., the gas will not be trapped in the dent, since the gas stays in an upper portion of the housing 44. That is, the lower plate of the housing 44 is sufficiently cooled by water flowing in the housing 44 and thus is not locally heated. Accordingly, the housing 44 is hardly affected by deformations from manufacturing errors, without the upper and lower plates being tilted.

Further, in the present embodiment, the position where gas stays within each housing 60 is controllable, and thus all the spaces 42*a* to 42*c* of the cooling unit 40 can be cooled by a water cooling system. In the space 42*a* closest to the heat treatment unit 20, the object 12 has a higher temperature, and thus sites where the gas stays can be heated to a high temperature beyond the tolerable temperature even by employing a conventional water cooling system (a water cooling system using cuboid-shaped housings with non-tilted upper plates). Therefore, generally, an air cooling system (i.e., a cooling system using housings in which gas, such as air, circulates) is used for the space 42*a* closest to the heat treatment unit 20 to cool the object 12, while a water cooling system is used for the spaces 42*b*, 42*c* positioned downstream of the space 42*a*. In the present embodiment, the position where gas stays within each housing 60 is controllable, and thus the water cooling system can be used also for the space 42*a* closest to the heat treatment unit 20. If the entire upper surface 62*a* can be heated to a high temperature, the entire upper plate 62*a* of the housing 60 may be covered with the heat insulating material. In this instance, a thickness of the heat insulating material covering the entire upper plate 62*a* is adjusted to a thickness that does not allow the housing 60 to have a temperature beyond the tolerable temperature in the space 42*a* closest to the heat treatment unit 20 and brings a higher cooling capacity than that of the air cooling system. This improves the cooling capacity in the space 42*a* closest to the heat treatment unit 20 and enables a reduction in the length of the cooling unit 40. The reduction in the length of the cooling unit 40 (specifically, the length of the space 42*a* in the conveying direction) leads to a reduction in cooling time (i.e., treatment time by the heat treatment furnace 10).

Second Embodiment

Figure 5:
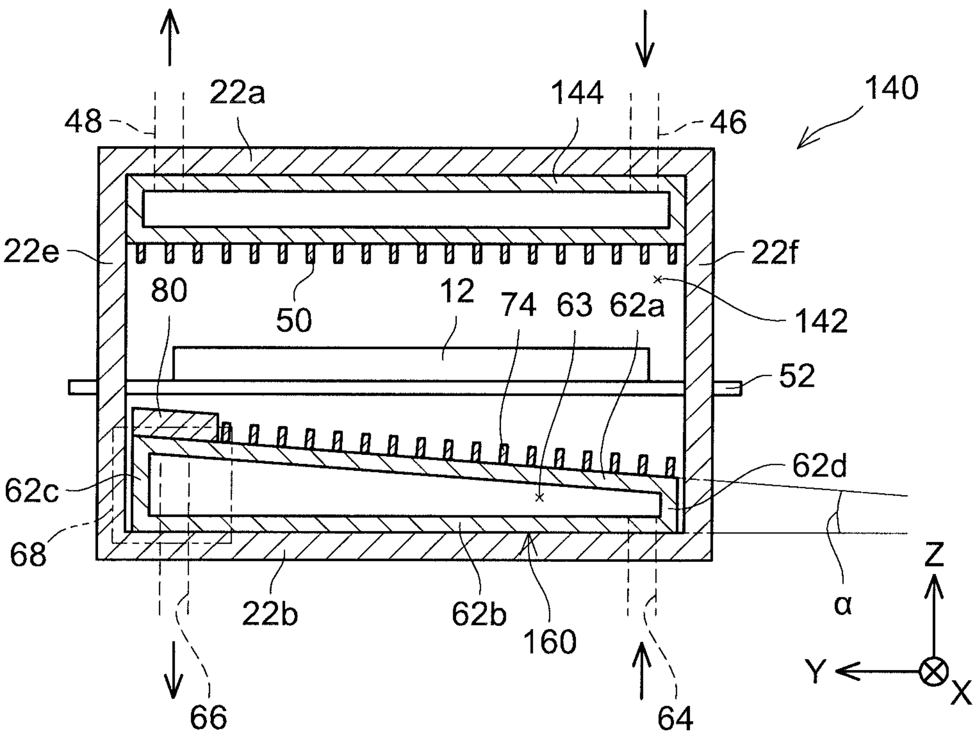
FIG. 5 is an explanatory cross-sectional view for configuration of a lower housing in the second embodiment.

In the first embodiment above, the surfaces of the housings 44, 60 exposed to the spaces 42 are substantially flat, however. they may have other configurations. For example, as illustrated in FIG. 5, surfaces of housings 144, 160 exposed to a space 142 in a cooling unit 140 may be provided with fins 50, 74. In the present embodiment, the configurations of the housings 144, 160 are different from those of the housings 44, 60 in the first embodiment but the other elements are substantially the same. Accordingly, for the elements same as those of the heat treatment furnace 10 in the first embodiment, description for them is omitted.

The housings 144, 160 are disposed in the cooling unit 140. Each housing 144 is positioned above the conveyor rollers 52. A plurality of fins 50 is provided on a lower surface of the housing 144. The plurality of fins 50 is exposed to the space 142. Each housing 160 is positioned below the conveyor rollers 52. A plurality of fins 74 is provided on an upper surface of the housing 160 and is exposed to the space 142. As with the housings 144, 160, the fins 50, 74 are constituted of stainless steel. The fins 50, 74 may be constituted of a material with high thermal conductivity, for example. iron (e.g . . . SS400), aluminum, or the like.

Figure 6:
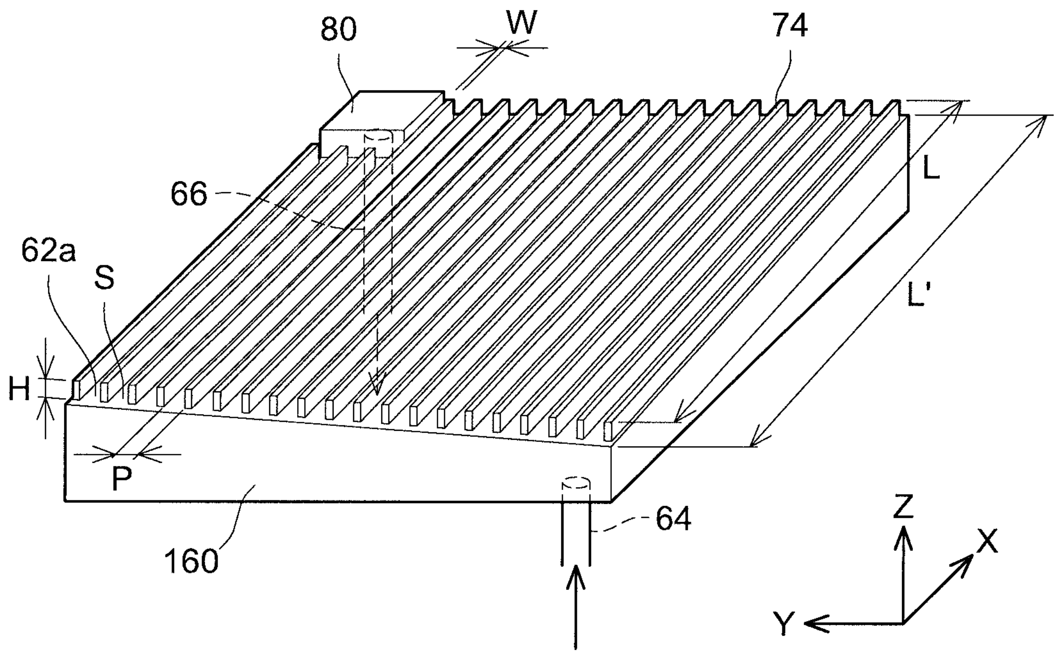
FIG. 6 is an explanatory perspective view for configuration of the lower housing in the second embodiment.

The fins 74 will be further described. Further description for the fins 50 is omitted because the configuration of the fins 50 is substantially the same as that of the fins 74. As illustrated in FIG. 6, the fins 74 extend in the conveying direction (in X-direction in FIG. 6) and are arranged parallel to the conveying direction. A ratio of a height H, which is a dimension of the fins 74 in a height direction, to a distance P between adjacent fins 74 (H/P) is in a range from 0.1 to 5. Further, a ratio of a length L, which is a dimension of the fins 74 in the conveying direction, to a length L', which is a dimension of the upper plate 62*a* in the conveying direction (L/L') is in a range from 0.5 to 1. Further, an area of the upper surface of the upper plate 62*a* that is occupied by the plurality of fins 74 (i.e., an area calculated by multiplying a width W, which is a dimension of the fin 74 in the direction perpendicular to the conveying direction, the length L of the fin 74 in the conveying direction, and the number of fins 74 provided on the upper plate 62*a*) is 0.005 to 0.5 times an area S of the upper surface of the upper plate 62*a*. The fins 74 are provided on all over the upper surface of the upper plate 62*a*, except for the portion covered by the heat insulating material 80.

In the present embodiment, the fins 50, 74 are provided on the surfaces of the housings 144, 160 exposed to the spaces 142. Surface areas of the housings 144, 160 exposed to the spaces 142 are increased by the fins 50, 74. thereby improving the cooling capacity of the housings 144, 160.

Specific examples of the disclosure herein have been described in detail, however, these are mere exemplary indications and thus do not limit the scope of the claims. The art described in the claims includes modifications and variations of the specific examples presented above. Technical features described in the description and the drawings may technically be useful alone or in various combinations, and are not limited to the combinations as originally claimed. Further, the purpose of the examples illustrated by the present description or drawings is to satisfy multiple objectives simultaneously, and satisfying any one of those objectives gives technical utility to the present disclosure.

What is claimed is:

1. A heat treatment furnace comprising:

a heat treatment unit configured to heat treat an object;

a cooling unit configured to cool the object heat-treated by the heat treatment unit; and a conveyor configured to convey the object in the heat treatment unit and the cooling unit, wherein the cooling unit comprises a housing, wherein the housing is disposed below a conveyance path on which the object is conveyed by the conveyor and configured to cool the object being conveyed by the conveyor by liquid flowing inside the housing, the housing comprises an upper plate facing the object being conveyed by the conveyor, the upper plate is tilted so that gas stays at a predetermined portion of the housing while the liquid is flowing in the housing, and wherein the upper plate is tilted in a conveying direction of the object.

2. The heat treatment furnace according to claim 1, wherein the upper plate is tilted in a width direction as viewed in the conveying direction.

3. The heat treatment furnace according to claim 2, wherein the upper plate is tilted by 2 degrees or more in the width direction.

4. The heat treatment furnace according to claim 2, wherein as the housing is viewed in the conveying direction, an upper surface of an upper end portion of the upper plate is covered with a heat insulating material.

5. The heat treatment furnace according to claim 1, wherein the upper plate is tilted by 2 degrees or more.

6. The heat treatment furnace according to claim 5, wherein the upper plate is tilted by 2 degrees or more in the conveying direction.

7. The heat treatment furnace according to claim 1, wherein the housing further comprises:

a liquid supply port defined in a portion of the housing where a height level of the upper plate is lowest; and a liquid discharge port defined in a portion of the housing where the height level of the upper plate is highest.

8. The heat treatment furnace according to claim 1, wherein the housing further comprises a fin provided on an upper surface of the upper plate and exposed to an internal space of the cooling unit.

* * * * *